United States Patent [19]
Kohler

[11] 4,361,331
[45] Nov. 30, 1982

[54] SEAL FOR VACUUM FLANGE CONNECTIONS

[75] Inventor: Marcel Kohler, Fürstentum, Liechtenstein

[73] Assignee: Balzers Aktiengesellschaft für Hochvakuumtechnic und Dünne Schichten, Liechtenstein

[21] Appl. No.: 199,499

[22] Filed: Nov. 14, 1980

[30] Foreign Application Priority Data

Oct. 22, 1979 [CH] Switzerland ............... 9807/79

[51] Int. Cl.³ .............................................. F16J 15/08
[52] U.S. Cl. ............................... 277/1; 277/167.5; 277/236; 285/12; 285/363; 285/DIG. 18
[58] Field of Search ........... 277/1, 167.5, 105, 235 R, 277/236, 234, 205, 206 A; 285/12, 363, 368, DIG. 18

[56] References Cited

U.S. PATENT DOCUMENTS

| | | | |
|---|---|---|---|
| 3,208,758 | 9/1965 | Carlson et al. | 277/236 X |
| 3,298,719 | 1/1967 | Bills et al. | 277/236 X |
| 3,301,578 | 1/1967 | Platt et al. | 277/236 X |
| 3,479,063 | 11/1969 | Raver | 285/363 X |
| 3,747,963 | 7/1973 | Shivak | 277/236 X |

FOREIGN PATENT DOCUMENTS

1959561 12/1974 Fed. Rep. of Germany .......... 277/1

*Primary Examiner*—Robert S. Ward, Jr.
*Attorney, Agent, or Firm*—McGlew and Tuttle

[57] ABSTRACT

A seal for vacuum flange connections includes a plastically deformable seal ring and an associated ring designed to ensure that the seal remains tight even upon cooling after a previous heating. This is obtained by providing a support ring having two resilient retaining portions, each for one plastically deformable seal ring. The design makes it possible to repeatedly use and reuse seal rings, which preferably are made of metal for example, gold.

10 Claims, 12 Drawing Figures

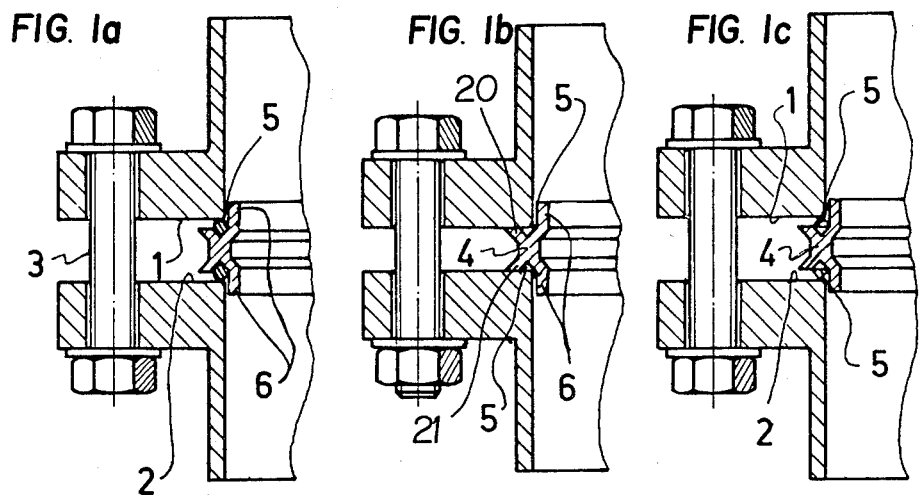
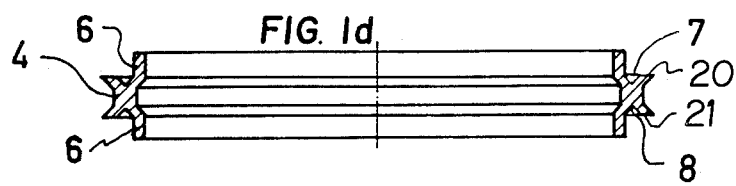
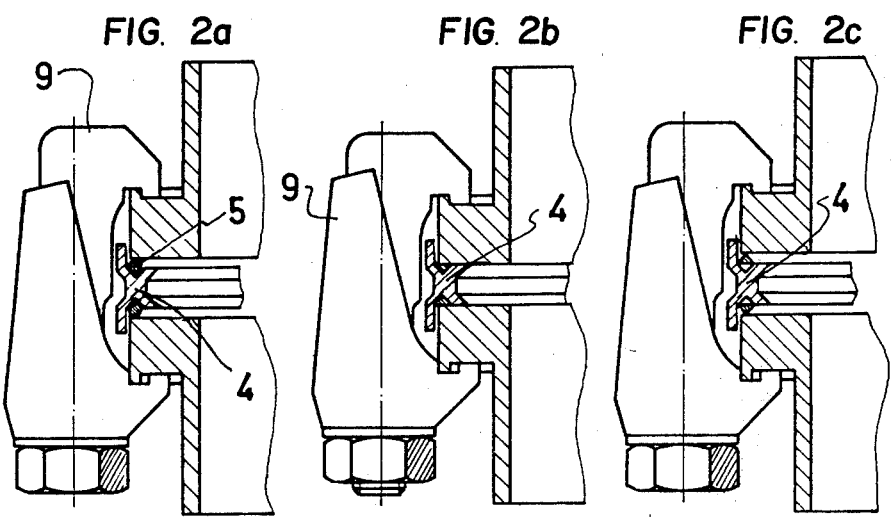
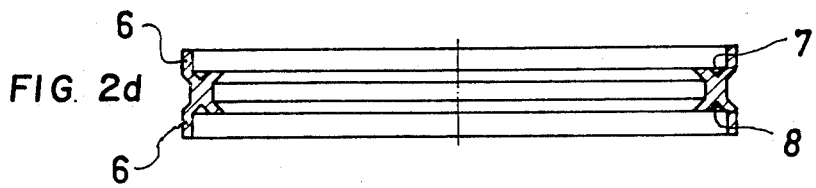

SEAL FOR VACUUM FLANGE CONNECTIONS

FIELD AND BACKGROUND OF THE INVENTION

The present invention relates in general to seal construction and in particular to a new and useful seal element for flange connections, comprising a plastically deformable seal ring with a support ring associated therewith.

Seal elements are known in a variety of designs. Particular importance has been attached to seals in the form of plastically deformable metal rings, particularly for sealing under conditions of high temperature, for example, ultra-high vacuum seals which must be heated. It is known, however, that plastically deformable seal rings have the disadvantage that in most instances they can be used only once. Then, they are so severely deformed that they do not provide satisfactory sealing in further use. Especially in ultra-high vacuum apparatus where gold wire seal rings are frequently employed, re-use is a significant consideration for reasons of economy.

German Pat. No. 1,959,561 discloses a method of repeatedly using a seal element comprising a seal ring of a plastically deformable material, providing that at every re-use, the seal ring is inserted into the receiving groove in upside down position. In a simple embodiment, this prior art method requires unequal (asymmetric) flanges, which is a considerable disadvantage in practice. The cited patent does provide that, with parts to be sealed which are shaped symmetrically relative to the sealing plane, the asymmetry of the receiving groove is obtained by inserting a special centering ring having a side surface inclined relative to the sealing plane. However, there is still the disadvantage that the flange surface cannot be smooth, they must both be provided with a corresponding groove.

Another problem arising with plastically deformable seal rings particularly in the ultra-high vacuum technique is that even if used only once in connection with a heating process, such a seal may not remain tight, i.e., it is tight during the temperature increase but frequently becomes loose as the temperature decreases again. This may be explained by considering that during the heating the flanges to be connected to each other expand so that the plastic seal ring is subjected to high pressure and deformed, and then as the flanges cool down they reassume their initial size while the seal rings remain deformed. This may result in gaps, thus gas conducting bridges between the sealing surfaces.

SUMMARY OF THE INVENTION

The present invention is related to a seal for vacuum flange connections that insure even if the seal rings are used which plastically deform during heating, the tightness of the seal remains unaffected even upon a following cooling. The invention is further directed to a special design of a seal permitting the re-use of the metal seal rings repeatedly while at the same time providing flanges which are symmetrical and smooth.

To this end a seal for vacuum flange connections is provided including a plastically deformable seal ring and a support ring associated therewith, in which the support ring comprises two resiliently movable portions, each for retaining one plastically deformable seal ring.

The resilient retention produces the effect that even upon cooling, the plastically deformable seal rings remains firmly pressed into contact with the associated surface of the flange, and no leaks can form. By designing the support ring with two retaining portions for seal rings, with each of the two seal rings cooperating with one of the flange surfaces, it is further obtained that upon preceding use, the seal rings need only be interchanged or turned upside down to regain the capability of being subjected again to a plastic deformation during the next establishment of a connection.

Accordingly, an object of the present invention is to provide a seal for sealing a space between two flanges of a vacuum flange connection comprising, a support ring having two resiliently movable wall portions each associated with one flange and a plastically deformable seal ring disposed and deformed between each resiliently movable wall portion and an associated flange, whereby, when the space between the two flanges is sealed, the resiliently movable wall portions resiliently press said seal rings against their associated flanges.

Another object of the present invention is to provide a method of sealing the space between two flanges of a vacuum flange connection comprising resiliently deforming and holding a pair of plastically deformable seal rings against the two flanges respectively using a support ring having two resiliently movable wall portions pressing the seal rings to their associated flanges.

Another object of the present invention is to provide a seal for vacuum flange connections which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1a is a sectional view of a seal for sealing a space between two flanges of a vacuum flange connection according to the invention before the flanges are moved together and sealed in their final position;

FIG. 1b is a view similar to FIG. 1a of the inventive seal and vacuum connection when the flanges are in their final position;

FIG. 1c is a view similar to FIG. 1a of the inventive seal with the plastically deformable sealing rings reversed for re-use;

FIG. 1d is a sectional view of an entire support ring constructed in accordance with the invention;

FIG. 2a is a view similar to FIG. 1a of a different embodiment of the invention;

FIG. 2b is a view similar to FIG. 1b of the other embodiment of the invention;

FIG. 2c is a view similar to FIG. 1c of the other embodiment of the invention;

FIG. 2d is a view similar to FIG. 1d of the other embodiment of the invention;

DESCRIPTION OF THE PREFERRED EMBODIMENTS

Figure 3:
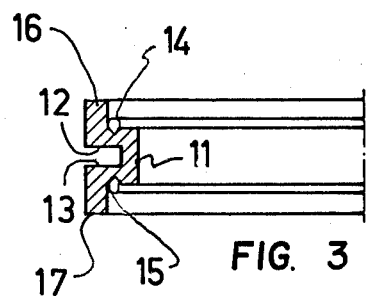
FIG. 3 is a partial elevational view, partly in section of another embodiment of the invention.
Figure 4:
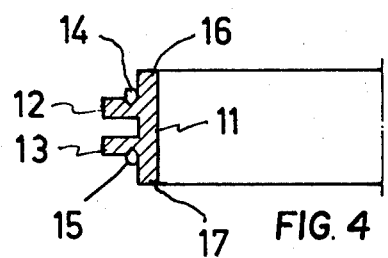
FIG. 4 is a view similar to FIG. 3 of a still further embodiment of the invention.

In FIGS. 1a to 1c, two flanges surfaces 1 and 2 are shown to be firmly joined to each other along their circumferences by a number of bolts 3. The whole support ring indicated at 4 is shown in section in FIG. 1d.

In FIG. 1a the seal rings 5 are seen in non-compressed state, thus prior to their plastic deformation, since the flanges are not yet completely screwed to each other. In FIG. 1b, seal rings 5 are already compressed, in their sealing state. FIG. 1c indicates how seal rings 5 which were deformed according to FIG. 1b can again be inserted, upon exchange or after being turned upside down, into retaining portions (grooves 7,8) of support ring 4, to be plastically deformed again and to form a new tight seal as the flanges are firmly bolted together. As may be learned from the figures, support ring 4 is designed with centering extensions 6 on the inside, which fit the inside of flanges 1, 2 and thus ensure the centering of inserted seal rings 5. The cross section of support ring 4 is shaped to make the side walls of grooves 7,8, which serve as retaining portions for the two seal rings sufficiently resiliently compliant and thus capable of elastically flexing laterally or backwardly while the seal rings are compressed during the heating period. As a result, the grooves open to some extent like scissors and the plastically deformable seal rings are pressed into the enlarged groove space. As the structure cools down, the pressure between the flanges in the axial direction decreases, the angle between the resiliently yielding sidewalls 20 and 21 of the grooves narrows again, and the seal rings remain firmly pressed against the sealing surfaces, so that a gap formation, as mentioned above and possible in prior art seals with plastically deformable materials, is prevented.

The embodiment of FIGS. 2a to 2d differs from that of FIGS. 1a to 1d only in the disposition of the centering extensions which, in this case, are provided on the outside. FIGS. 2a and 2c further show that clamps may be provided instead of bolts for tightly pressing the flanges against each other, which, however, is not a substantial feature of the invention. Otherwise, the function is identical to that according to FIG. 1.

Figure 5:
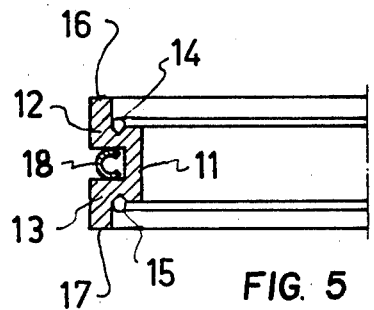
FIG. 5 is a view similar to FIG. 3 of a still further embodiment of the invention.
Figure 6:
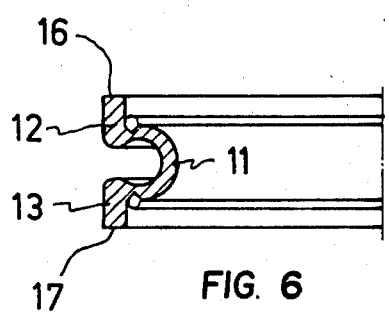
FIG. 6 is a view similar to FIG. 3 of another embodiment of the invention.

FIGS. 3 to 6 show other possible designs of the resilient retaining portions for seal rings. In all these variants, a central web portion 11 of the support ring joins two resiliently deflective outer ring portions 12, 13 carrying seal rings 14,15. According to FIG. 3 as well as FIGS. 5 and 6, ring portions 12,13 are at the same time designed as outside centering rings, while according to FIG. 4 these portions form a centering ring on the inside. A particularity of the design of FIG. 5 is an additional spring element 17 which, upon being correspondingly deformed, supports the spring force exerted by ring portions 12,13 in the axial direction. In the seal element of FIG. 6, the central web portion of the support ring itself is designed as such an additional spring element.

While specific embodiments of the invention have been shown and described in detail to illustrate the application of the principles of the invention, it will be understood that the invention may be embodied otherwise without departing from such principles.

What is claimed is:

1. A seal for sealing a space between two flanges of a vacuum flange connection comprising, a support ring having two resiliently movable wall portions each associated with one flange and a plastically deformable seal ring disposed and deformable between each resiliently movable wall portion and an associated flange, whereby, when the space is sealed, the resiliently movable wall portions press said plastically deformable seal rings against their associated flanges and maintain the pressure even with variations in temperature.

2. A seal according to claim 1, wherein said support ring includes a centering extension extending outwardly beyond said resiliently movable wall portions for centering said support ring with respect to the two flanges.

3. A seal according to claim 1, wherein said support ring includes a web connected between said resiliently movable wall portions, said web being resiliently deformable to permit resilient movement of said resiliently movable wall portions.

4. A seal according to claim 2, wherein said resiliently movable wall portions extend at an acute angle to said centering extension.

5. A seal according to claim 3, wherein said web extends axially of a central axis of said support ring.

6. A seal according to claim 3, wherein said web is curved between said two resiliently movable wall portions.

7. A seal according to claim 1, wherein said support ring includes a triangular groove adjacent each of said resiliently movable wall portions and facing each associated flange for receiving each of said plastically deformable seal rings.

8. A seal according to claim 3, including an additional spring element disposed between said resiliently movable wall portions for resiliently moving said resiliently movable wall portions.

9. A method of sealing a space between two flanges of a vacuum flange connection comprising, plastically deforming a plastically deformable seal ring against each flange and resiliently holding each plastically deformed plastically deformable seal ring against each flange using a support ring having two resiliently movable wall portions.

10. A method according to claim 9, including resiliently separating the two resiliently movable wall portions to resiliently press the plastically deformed sealing rings against their associated flanges.

* * * * *